United States Patent
Loveday

(10) Patent No.: US 9,845,902 B2
(45) Date of Patent: Dec. 19, 2017

(54) CONDUIT FOR IMPROVED FLUID FLOW AND HEAT TRANSFER

(71) Applicant: Ronald Lee Loveday, Corpus Christi, TX (US)

(72) Inventor: Ronald Lee Loveday, Corpus Christi, TX (US)

(73) Assignee: INNERGEO LLC, Corpus Christi, TX (US)

( * ) Notice: Subject to any disclaimer, the term of this patent is extended or adjusted under 35 U.S.C. 154(b) by 0 days.

(21) Appl. No.: 13/841,395

(22) Filed: Mar. 15, 2013

(65) Prior Publication Data

US 2013/0299036 A1 Nov. 14, 2013

Related U.S. Application Data

(60) Provisional application No. 61/646,308, filed on May 13, 2012.

(51) Int. Cl.
*F28F 13/12* (2006.01)
*F16L 9/00* (2006.01)
*F28F 1/40* (2006.01)
*F28F 1/06* (2006.01)

(52) U.S. Cl.
CPC .............. *F16L 9/00* (2013.01); *F16L 9/006* (2013.01); *F28F 1/06* (2013.01); *F28F 1/40* (2013.01); *F28F 13/12* (2013.01)

(58) Field of Classification Search
CPC .................................... F16L 9/00; F16L 9/006
USPC .................................................... 138/38, 177
See application file for complete search history.

(56) References Cited

U.S. PATENT DOCUMENTS

| | | | | |
|---|---|---|---|---|
| 3,273,599 A | * | 9/1966 | Heeren | 138/38 |
| 3,664,928 A | * | 5/1972 | Roberts | 202/236 |
| 3,861,462 A | * | 1/1975 | McLain | 165/179 |
| 3,981,356 A | * | 9/1976 | Granetzke | 165/179 |
| 4,248,179 A | * | 2/1981 | Bonner | 122/235.14 |
| 4,425,942 A | * | 1/1984 | Hage et al. | 138/38 |
| 4,690,211 A | * | 9/1987 | Kuwahara et al. | 165/177 |
| 4,705,103 A | * | 11/1987 | Zogg et al. | 165/110 |
| 4,759,516 A | * | 7/1988 | Grose | 244/130 |
| 5,375,654 A | | 12/1994 | Hougland et al. | |
| 5,458,191 A | * | 10/1995 | Chiang | F28F 1/40 165/133 |
| 5,577,555 A | * | 11/1996 | Hisajima et al. | 165/133 |
| 5,736,059 A | | 4/1998 | Mackelvie | |

(Continued)

FOREIGN PATENT DOCUMENTS

EP 2103818 A1 9/2009

OTHER PUBLICATIONS

International Search Report dated Sep. 10, 2013, during prosecution of International Application No. PCT/US2013/040747.

(Continued)

*Primary Examiner* — Vishal Pancholi
(74) *Attorney, Agent, or Firm* — Norton Rose Fulbright US LLP

(57) ABSTRACT

The present disclosure provides conduits with modified interior surfaces that increase the surface area of the interior surface of the conduit to provide the conduit with improved thermal energy exchange with the wall of the conduit. The modified interior surfaces can also be configured to reduce friction flow on the fluid passing therethrough.

8 Claims, 4 Drawing Sheets

(56) References Cited

U.S. PATENT DOCUMENTS

| | | | |
|---|---|---|---|
| 5,992,513 A * | 11/1999 | Suzuki | F28F 1/40 165/133 |
| 6,119,987 A | 9/2000 | Kiknadze et al. | |
| 6,120,285 A * | 9/2000 | Smith | C30B 25/08 118/715 |
| 6,510,870 B1 * | 1/2003 | Valaszkai et al. | 138/38 |
| 6,883,597 B2 * | 4/2005 | Thors | F28F 1/40 165/133 |
| 7,044,210 B2 * | 5/2006 | Usui | 165/177 |
| 7,727,179 B2 * | 6/2010 | Barrett | 604/27 |
| 2005/0241605 A1 * | 11/2005 | Bedwell et al. | 123/184.21 |
| 2008/0149309 A1 * | 6/2008 | Li et al. | 165/104.19 |
| 2009/0229801 A1 * | 9/2009 | Stewart | 165/151 |

OTHER PUBLICATIONS

"Drilling 10,000 m deep geothermal wells", renewableenergyfocus.com, Sep. 15, 2010, available at http://www.renewableenergyfocus.com/view/12469/drilling-10-000-m-deep-geothermal-wells/.

* cited by examiner

CONDUIT FOR IMPROVED FLUID FLOW AND HEAT TRANSFER

CROSS-REFERENCE TO RELATED APPLICATIONS

This Application claims the benefit of U.S. Provisional Application 61/646,308 filed on May 13, 2012, which is incorporated by reference in its entirety.

TECHNICAL FIELD

The present disclosure relates generally to heat transfer and fluid flow and more particularly to conduits that permit increased fluid flow and decreased energy use in transporting fluids through conduits and other confined turbulent flow systems.

BACKGROUND OF THE DISCLOSURE

Fluid flow in a pipe or a channel occurs ubiquitously in domestic or industrial settings. Generally, the carrying capacity of a pipe depends on the diameter of the pipe, friction within the pipe, and other factors. The flow resistance of a pipe increases rapidly when the flow rate increases above onset of turbulent flow. Turbulence induced friction losses can consume significant unnecessary energy costs annually. Typically, flow can be driven by pumps providing a pressure head that overcomes the wall friction or the drag in the flow. For a given flow rate, an increase in pressure head requires an increase in pumping energy, causing a corresponding increase in the cost of operation. Thus, for a given flow rate, a decrease in drag force, resulting in a decrease in pressure head, is a desired operating strategy. Drag reduction for liquid flow in a pipe or channel flow is commonly achieved by adding chemicals such as surfactants or polymers to the liquid. Through the formation of surfactant micelles or polymer chains in the bulk liquid, the frequency of formation and size of the turbulence eddies can be dampened. While the use of chemicals is effective in reducing drag, the chemicals can be costly and environmentally unfriendly. In addition to the flow resistance, a standard conduit also has poor heat transfer properties that limit the thermal energy exchange between the wall of the conduit and the fluid flowing through the conduit.

Current state of the art considers head loss as a function of the condition inside the pipe. Conventional fluid dynamics holds that rough surfaces inside the pipe promotes a layer of non-moving or slow moving liquid near the pipe wall. This, according to conventional science, increases friction losses. The Hazen-Williams equation is instructive. Pressure drop, in the Hazen-Williams equation is inversely related to the smoothness of the pipe. The roughness coefficient C may be set to 150 for a smooth copper pipe, where a rough cast iron pipe may be as low as 80. For a 10-foot length of 4-inch pipe, the head loss for copper may be 0.007 psi while the head loss for the same pipe in rough cast iron would be 0.022 psi.

Conventional science also teaches that when liquid flowing inside a pipe is asked to change direction or velocity, there is a reduction in energy. This reduction can be translated directly into head loss in a given pipe. As such, in pipe used today, great care has been taken to ensure the interior is as smooth as possible. Advanced fluid dynamics methods of modified interior pipe structures, however, presents a novel improvement on conventional pipe design.

BRIEF SUMMARY OF THE DISCLOSURE

According to one aspect of the present disclosure, there is provided a conduit comprising: at least one modified surface feature configured to increase the surface area of the conduit; wherein said at least one modified surface feature is disposed on the interior wall of said conduit.

In one embodiment, the modified surface feature comprises a geometric shape. In another embodiment, the modified surface feature comprises a depth. In another embodiment, the dimensions and/or shape of the at least one modified surface feature is determined at least by the desired increase in the surface area of the conduit.

In one embodiment, the increase in surface area is configured to increase thermal transfer between fluid flowing through the conduit and the wall of the conduit. In one embodiment, the increase in thermal transfer is achieved by an increase in turbulence of the fluid flowing through the conduit.

In one embodiment, the dimensions and/or shape of the at least one modified surface feature is determined at least by the desired reduction in friction of fluid flowing through the conduit. In one embodiment, the reduction in friction is achieved by the dimensions and/or shape of the at least one modified surface feature configured to provide directionality to turbulence in fluid flowing through the conduit. In one embodiment, the directionality is achieved by the dimensions and/or shape of the at least one modified surface feature configured to create a plurality of vortices that give the fluid turbulence a uniform direction.

According to another aspect of the present disclosure, there is provided a method comprising: providing a conduit with at least one modified surface feature configured to increase the surface area of the conduit; wherein said at least one modified surface feature is disposed on the interior wall of said conduit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale for certain embodiments (unless otherwise noted), meaning the sizes of the depicted elements are accurate relative to each other for at least the depicted embodiment.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein

DETAILED DESCRIPTION OF THE DISCLOSURE

As used herein, "a" and "an" means one or more than one unless otherwise stated.

As recited herein, the present disclosure provides conduits with modified internal surfaces particularized to either reduce internal friction imparted on the fluid flowing through the conduit, increase heat transfer between the surface material of the conduit and the fluid moving through the conduit, or both. The modified interior surfaces of the present disclosure improve the heat transfer characteristics of the conduits of the present disclosure over a standard conduit. The modified interior surfaces comprise a series of modified surface features such as indentations, cuts, scraps, gouges, or grinding into the interior surface of a conduit. The modified interior surfaces of the present disclosure also improve the flow characteristics of the conduit by reducing drag or friction acting on the fluid as it flows through the conduit.

In one embodiment, the modified interior surfaces comprise a regular pattern of indentations to give the fluid a flow direction. In another embodiment, the modified interior surfaces comprise an irregular pattern of indentations to cause or increase the turbulence of fluid flow, thereby allowing the fluid to mix. The increase in turbulence improves heat transfer from the environment exterior to the conduit through convection and conduction. In addition to or as an alternative, changing the shape of the modified surface features of the present disclosure may reduce friction by giving the turbulence of the fluid flow directionality. For instance, offsetting and elongation of the indentations or modified surface features create small vortices giving the fluid turbulence a uniform direction that reduces the friction in the flow.

The reduction of the friction provided by the modified interior surfaces also reduces the power required to move the fluid through the conduit. In addition, the friction reduction also increases the fluid velocity, and thus improves the throughput of the fluid that moves through the conduit.

Figure 1A:
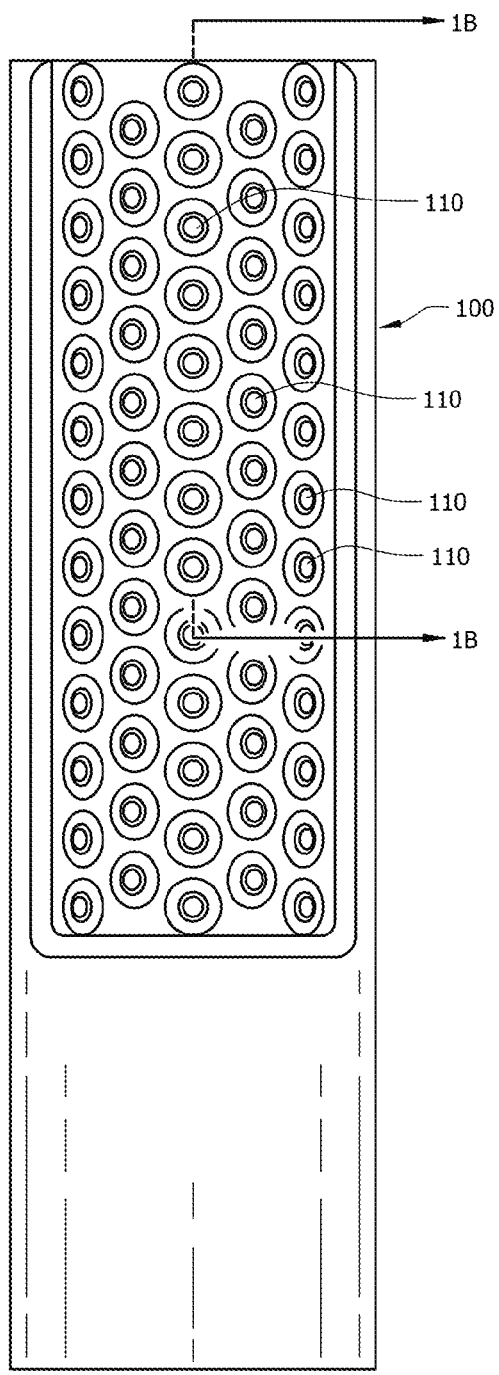
FIGS. 1A and 1B illustrate an exemplary feature that improves the heat transfer efficiency of the geothermal well according to the present disclosure.
Figure 1B:
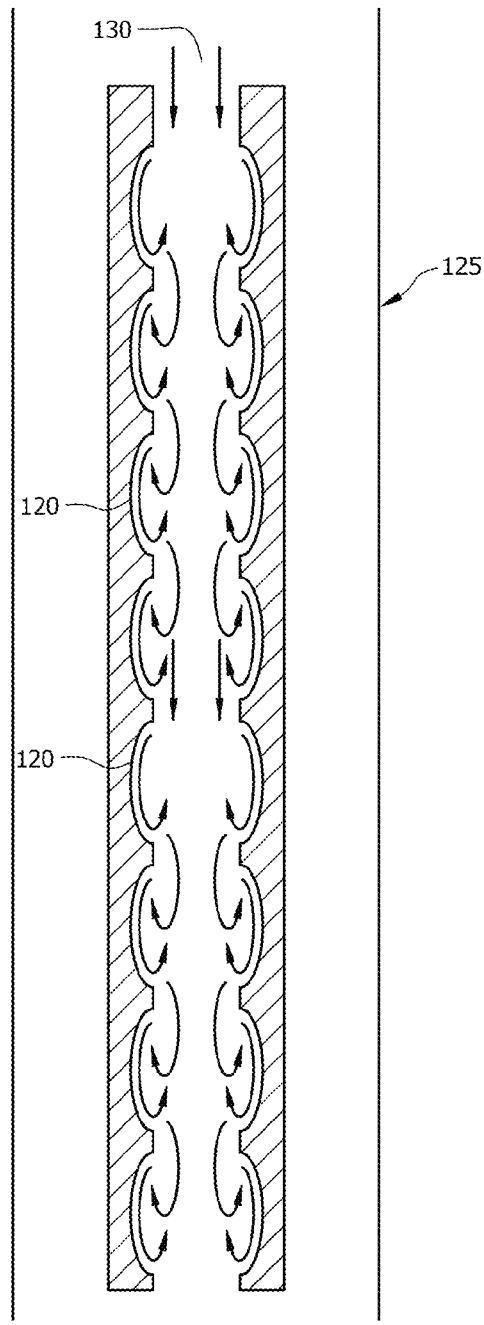

FIGS. 1A and 1B depict certain specific exemplary embodiments of the current disclosure. FIG. 1A shows a cut-out of a conduit with a modified internal surface area, achieved by providing indentations or dimples on the interior surface of the pipe or conduit ("dimpling"). FIG. 1B provides a cross-sectional view of the pipe depicted in FIG. 1A as disposed in a geothermal well 125. Cavities 120 of dimples 110 are configured to have a curvature that achieves the flow as shown by the arrows within the cavities. Fluid flows through the interior channel 130 in the direction indicated by the arrows at the top of FIG. 1B. Dimples 110 perform two functions. They control the transition of the fluid from laminar flow to turbulent flow. And they provide directionality to the turbulent flow.

Laminar flow within pipe is characterized by fluid flowing in a smooth line, parallel to each layer of itself. This means that the layer defined within the center of the conduit would have the same flow and direction—though not necessarily velocity—as the layer at the edge of the pipe. Laminar flow tends to operate in the lower velocity regime, where friction of the pipe wall has not yet impacted the connection between the layers. Turbulent flow, however, is characterized by less organized flow in perpendicular directions to the laminar flow of the fluid. These swirls, or eddies, inhibit the smooth nature of laminar flow, causing lateral mixing, and in particularly violent turbulence and increased friction.

The introduction of turbulence to a fluid system, however, does not always result in higher friction. Boundary layer transition, where a laminar flow transitions to one of turbulence is well known in the art of aircraft design. As air flows over an airfoil, it is separated into a laminar regime within the boundary layer and a turbulent one outside. While the laminar flow results in low skin friction, the system is characterized by adverse pressure gradients which can cause flow reversal within the boundary layer, and result in subsequent boundary layer separation. Consequential flow separation negatively affects the pressure distribution along the airfoil resulting in lower lift and higher drag.

In certain situations, it is advantageous to prematurely trigger a boundary layer transition, thereby reducing the pressure gradient problem. This is generally done with vortex generators—small external vanes or bumps perpendicular to the flow. Vortex generators are generally 80% as tall as the expected boundary layer.

Fluid flow within a pipe is different, and thus requires a novel solution. In accordance with the present disclosure, fluid flow within conduit is improved through the presence of dimples 110 in the interior surface of the conduit. FIG. 1B displays a representation of the transition from laminar to turbulent flow. This graphic is not to scale. As fluid flows through the conduit, the dimples redirect the fluid layer at the edge of the pipe, creating eddies characteristic of turbulent flow. In conventional conduit design, perpendicular flow near the interior surface would add friction. But the modified surface cavities also impart directionality within the turbulent flow.

Figure 6:
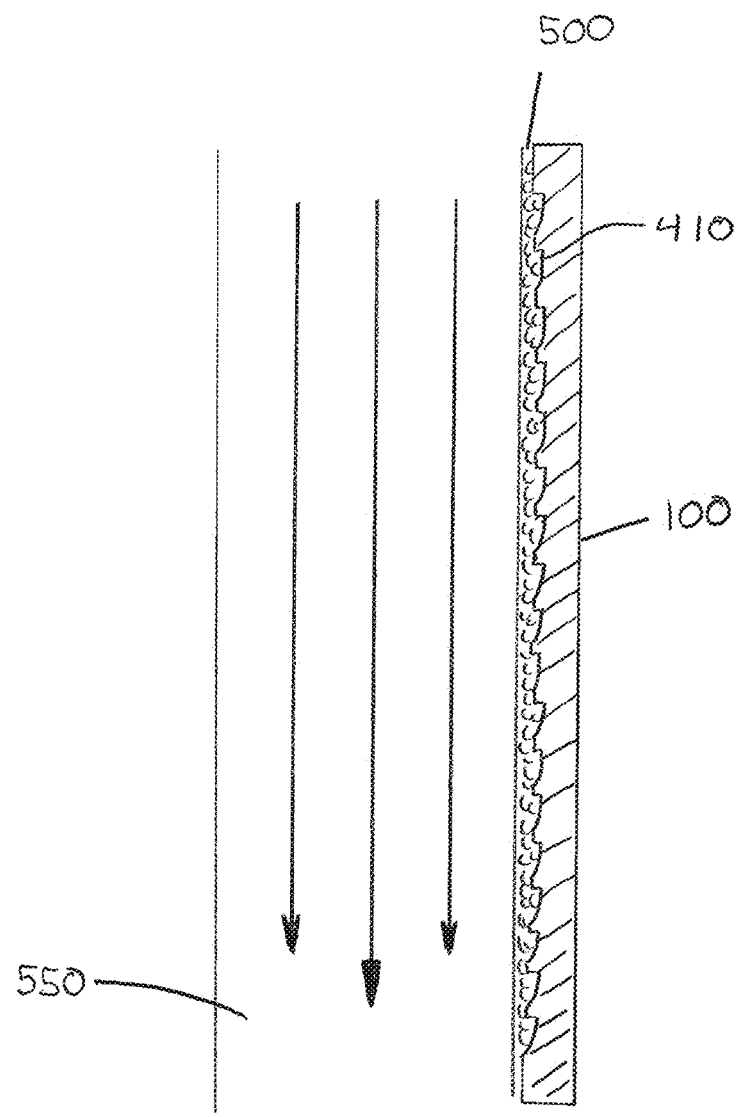
FIG. 6 depicts a cross-sectional view of a conduit with modified interior surface manipulating fluid flow into an organized turbulent layer and laminar centerline layer.

The vortices generated by dimples 110 and cavities 120 create a region of circulation adjacent to the pipe wall, encouraging a laminar flow regime in a larger cross-sectional area of the pipe than would exist if the dimples were not present. This directionality imparted on the turbulent layer thereby organizes it. See FIG. 6. The organized turbulent layer 500 reduces the pressure gradients, thereby reducing drag and increasing fluid flow in the centerline fluid layers 550. The friction level between the organized turbulent layer 500 and the centerline fluid flow 550 is different than the friction between the organized turbulent flow 500 and the wall of the pipe. The centerline fluid flow 550 benefits from this friction gradient. As the fluid within the organized turbulent layer 500 spins, it removes less energy from the adjacent centerline fluid flow 550 than would disorganized turbulent flow. The spinning turbulent layer, in effect, acts as veritable ball bearings along the interior edge of the pipe.

Flow friction is decreased as the organized turbulent layer acts as a lubricating layer for the main centerline flow. The organized layer is fashioned according to the size, shape, and depth of the cavities in the interior surface of the conduit. In some embodiments, the organized turbulent layer expands in depth. The use of dimples or other surface area enhancing surface features, in this case results in efficient thermal mixing of the working fluid through the turbulence that results when the working fluid meets the interior surface features 110 or 410. Thermal mixing may be controlled by the expansion of the organized turbulent layer. In some cases, decreased friction is traded off for increased thermal mixing, though in certain designs, both are concurrently achievable.

Figure 2:
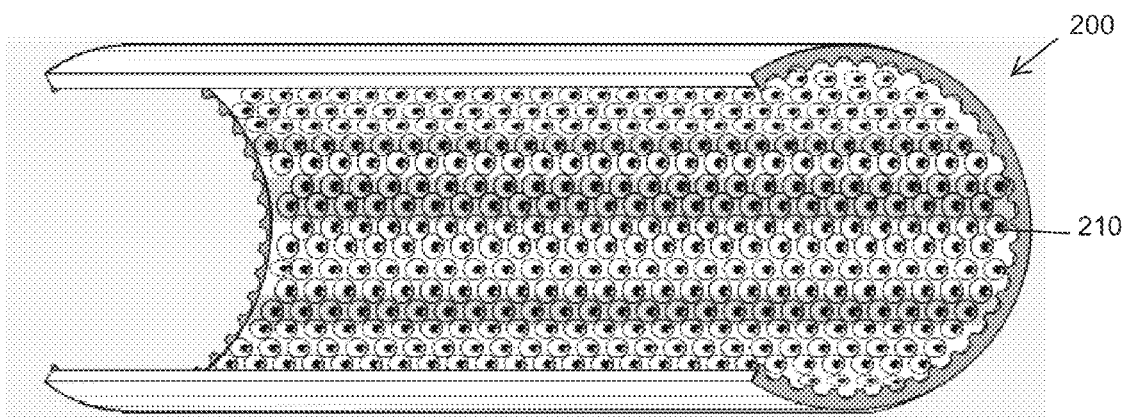
FIG. 2 shows a cutaway-section conduit with an exemplary modified interior surface according to the aspects of the present disclosure.
Figure 3:
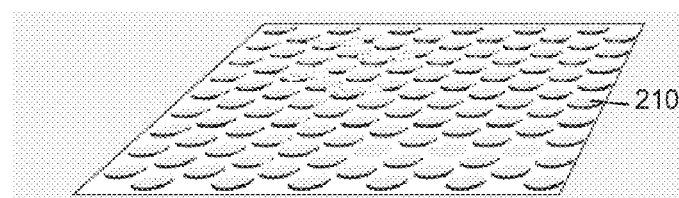
FIG. 3 shows a flat view of the modified interior surface of FIG. 2.

Referring to FIG. 2, conduit 200 has a series of dimples or indentations 210 in a regular pattern on its interior surface. Dimples or indentations 210 are generally semi-spherical. These impressions increase the surface area by stretching the interior surface toward the exterior. The pattern can vary from application to application with the size and depth differing in each case. FIG. 3 shows a perspective view of dimples or indentations 210 on conduit 200 when conduit 200 is laid out flat rather than in cylindrical form of FIG. 2.

Figure 4:
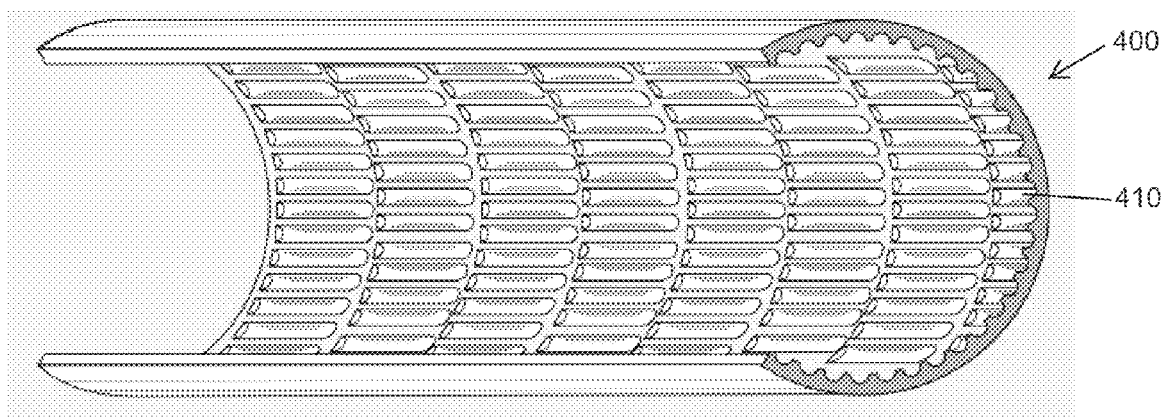
FIG. 4 shows a cutaway-section of conduit with another exemplary modified interior surface according to the aspects of the present disclosure.
Figure 5:
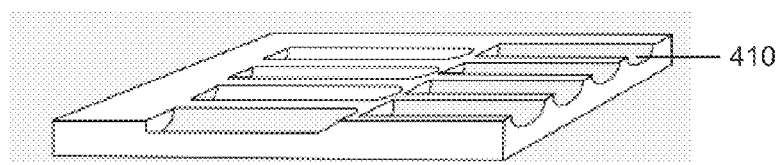
FIG. 5 shows a flat view of the modified interior surface of FIG. 4.

Referring to FIGS. 4 and 5, conduit 400 has a series of dimples or indentations 410 in a regular pattern on its interior surface. Dimples or indentations 410 provide an increase in surface area and increase in directional flow control and designed turbulence. Dimples or indentations 410 are generally cylindrical.

In one specific exemplary embodiment, the preferred dimple or modified surface feature for improved heat transfer for a given pipe or conduit with a 3" inner diameter (ID) a circular modified surface feature with a ⅜" diameter and a ⅛" depth. This specific exemplary embodiment provides a 100% increase in surface area over a pipe or conduit without the modified surface feature of the present disclosure. An example of the circular modified surface feature is shown in FIGS. 2-3. The dimensions of the modified surface features can be determined at least by the desired percentage increase in the original surface area of the conduit. For instance, the provided dimensions of the modified surface features of this embodiment can be decreased if only 80% increase in the original surface area is desired. In another embodiment, the dimensions of the modified surface features can be increased if more than 100% of the original surface area is desired.

Referring to FIGS. 4-5, the indentations or modified surface features 410, while shown as being more cylindrical when vied from the side with a rectangular front view, preferably resemble gouges on the interior surface of conduit 400. In the preferred embodiment, the gouge-like shapes of modified surface features 410 improve the flow through conduit 400. In a specific exemplary embodiment, the preferred modified surface feature for a given conduit with a 3" ID has a width of about ⅜", a depth of about ⅛", and a length of between about ⅝" to F. In one embodiment, one end of modified surface feature 410 has a smooth cut in to conduit 400 while the opposite end slopes up to original surface of the interior of conduit 400. While these specific dimensions are provided, they are not intended to be limiting. For embodiments with larger or smaller ID conduits, the dimensions of the modified surface features can be scaled accordingly.

It is contemplated that the two-dimensional front view of the modified surface feature of the present disclosure can have any regular or irregular geometric shapes. Regular geometric shapes include any polygon with three or more sides such as triangle, rectangle, pentagon, etc. Regular geometric shapes also include circular shapes such as elliptical, oval, etc. Irregular shapes can be based on any regular geometric shapes where the sides and corners may not be straight and can take on various irregularities such as askew, bent, fluctuating, jagged, serrated, sinuous, snaking, tortuous, or undulating lines.

It is also contemplated that the depth of the modified surface features of the present disclosure can be but need not be uniform across a single modified surface feature or between a plurality of modified surface features. A single conduit can have different sized and shaped modified surface features. For instance a conduit can have a region with modified surface features that are configured to increase the surface area for improved thermal transfer and another region with modified surface features that are configured to improve flow, or a region with modified surface features that do both. The modified surface features can be added to a particular conduit depending on the desired application.

Modified surface features are affirmatively etched into the interior surface of the modified conduit. Random discontinuities such as pipe fitting seams, defects in the conduit, or inherent roughness in the interior surface do not qualify as modified surface features according to the disclosure herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
providing a conduit having a direction of flow, a length parallel to the direction of flow, an interior surface, and an exterior surface;
providing, within the interior of the conduit, modified surface features selected from the group consisting of dimples and gouge-like shapes,
wherein the modified surface features have a length, width, and depth, and wherein the length of the modified surface features is parallel to the direction of flow and less than the length of the conduit, wherein the modified surface features are configured to increase the surface area of the conduit and to increase thermal transfer between liquid flowing through the conduit and a wall of the conduit, wherein the modified surface features are disposed on the interior surface of the conduit, and wherein the exterior surface comprises no modified surface features;

placing the conduit in a geothermal well; and flowing liquid through the conduit, wherein the thermal transfer occurs between the liquid and the wall of the conduit.

2. The method of claim 1, wherein the modified surface features are cylindrical.

3. The method of claim 1, wherein the length of the modified surface features is greater than the width of the modified surface features.

4. The method of claim 1, wherein the depth of the modified surface features slopes up at one end of the length.

5. The method of claim 1, wherein the modified surface features have a ratio of length to width of about 5:3.

6. The method of claim 1, wherein the modified surface features are configured to form eddies characteristic of turbulent flow.

7. The method of claim 1, wherein the modified surface features are configured to generate vortices within a boundary layer between turbulent and laminar flow.

8. The method of claim 1, wherein the modified surface features are configured to create a region of circulation adjacent to the interior surface.

* * * * *